United States Patent
Zhao et al.

(10) Patent No.: US 9,891,749 B2
(45) Date of Patent: Feb. 13, 2018

(54) DRIVING CIRCUIT AND DRIVING METHOD FOR TOUCH DEVICE, TOUCH DEVICE, AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Weijie Zhao, Beijing (CN); Xue Dong, Beijing (CN); Haisheng Wang, Beijing (CN); Yingming Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/304,398

(22) PCT Filed: Nov. 30, 2015

(86) PCT No.: PCT/CN2015/095900
§ 371 (c)(1),
(2) Date: Oct. 14, 2016

(87) PCT Pub. No.: WO2016/095693
PCT Pub. Date: Jun. 23, 2016

(65) Prior Publication Data
US 2017/0031517 A1   Feb. 2, 2017

(30) Foreign Application Priority Data
Dec. 19, 2014  (CN) .......................... 2014 1 0804325

(51) Int. Cl.
*G06F 3/045* (2006.01)
*G06F 3/041* (2006.01)
*G06F 3/044* (2006.01)

(52) U.S. Cl.
CPC ............ *G06F 3/0416* (2013.01); *G06F 3/041* (2013.01); *G06F 3/044* (2013.01); *G06F 3/0412* (2013.01); *G06F 2203/04107* (2013.01)

(58) Field of Classification Search
CPC ...... G06F 3/0416; G06F 3/041; G06F 3/0412; G06F 3/044; G06F 2203/04107
See application file for complete search history.

(56) References Cited

U.S. PATENT DOCUMENTS

| 8,115,786 B2 * | 2/2012 | Chang ................ G09G 3/3696 345/690 |
| 2009/0251495 A1 * | 10/2009 | Chang ................ G09G 3/3696 345/690 |
| 2017/0090644 A1 * | 3/2017 | Yao ........................ G06F 3/0416 |

FOREIGN PATENT DOCUMENTS

| CN | 101470556 A | 7/2009 |
| CN | 102339185 A | 2/2012 |

(Continued)

OTHER PUBLICATIONS

Chinese First Office Action for Chinese Application No. 201410804325.5, dated Dec. 22, 2016, 8 Pages.

(Continued)

*Primary Examiner* — Peter D McLoone
(74) *Attorney, Agent, or Firm* — Brooks Kushman P.C.

(57) ABSTRACT

The present disclosure provides a driving circuit and a driving method for a touch device, a touch device and a display device. The driving circuit includes an operational amplifier and a control circuit. A negative input terminal of the operational amplifier is connected with a touch-sensing electrode included in the touch device, and a positive input (Continued)

terminal of the operational amplifier is connected with the control circuit. The control circuit is to, at a touch stage, adjust a voltage at the positive input terminal of the operational amplifier to be within a first predetermined voltage range so as to control the touch-sensing electrode to implement a touch sensing operation, and at a display stage, adjust the voltage at the positive input terminal of the operational amplifier to be within a second predetermined voltage range so as to shield external static electricity.

16 Claims, 2 Drawing Sheets

(56) References Cited

FOREIGN PATENT DOCUMENTS

| CN | 102486707 A | 6/2012 |
|---|---|---|
| CN | 102968236 A | 3/2013 |
| CN | 102999219 A | 3/2013 |
| CN | 103577015 A | 2/2014 |
| CN | 103765354 A | 4/2014 |
| CN | 104142770 A | 11/2014 |
| CN | 104484070 A | 4/2015 |
| CN | 204256708 U | 4/2015 |
| JP | 2009122969 A | 6/2009 |

OTHER PUBLICATIONS

International Search Report and Written Opinion for Application No. PCT/CN2015/095900, dated Nov. 30, 2015, 12 Pages.

Digital Electronic Technology, 4.4 CMOS Gate Circuit—Fig. 4.4.2 Equivalent circuit of CMOS phase inverter, dated Jan. 31, 2010, 1 page.

Chinese Second Office Action for Chinese Application No. 201410804325.5, dated Jul. 4, 2017, 8 Pages.

* cited by examiner

DRIVING CIRCUIT AND DRIVING METHOD FOR TOUCH DEVICE, TOUCH DEVICE, AND DISPLAY DEVICE

CROSS-REFERENCE TO RELATED APPLICATIONS

This application is the U.S. national phase of PCT Application No. PCT/CN2015/095900 filed on Nov. 30, 2015, which claims priority to Chinese Patent Application No. 201410804325.5 filed on Dec. 19, 2014, the disclosures of which are incorporated in their entirety by reference herein.

TECHNICAL FIELD

The present disclosure relates to a field of display, and in particular, to a driving circuit and a driving method for a touch device, a touch device and a display device.

BACKGROUND

In the related art, a driving circuit for a touch device sets a voltage of a touch-sensing electrode to be within a first predetermined voltage range both at a touch stage and at a display stage. In such a manner, at the touch stage, the touch-sensing electrode may be controlled to perform a touch sensing operation, but at the display stage, external static electricity cannot be shielded, thus generating interference. Specifically, a circuit diagram of a current driving circuit for a touch device is shown in FIG. 1.

As shown in FIG. 1, the touch device in the related art includes a touch-driving electrode and a touch-sensing electrode RX. A driving circuit for the touch device includes an operational amplifier 11 and a control circuit 12. A positive input terminal of the operational amplifier 11 is connected with the control circuit 12, and a negative input terminal of the operational terminal 11 is connected with the touch-sensing electrode RX. An output voltage of the operational amplifier 11 is Vout. In FIG. 1, VDD is a power voltage and GND is the ground. The control circuit 12 includes a first voltage-dividing resistor R1 and a second voltage-dividing resistor R2. A first end of the resistor R1 is connected to the power voltage VDD, a second end of the resistor R1 is connected with a first end of the resistor R2, and a second end of the resistor R2 is connected with the ground GND. In FIG. 1, a feedback resistor Rf and a feedback capacitor Cf are connected in parallel between the negative input terminal and an output terminal of the operational amplifier 11, so as to control the operational amplifier 11 to implement deep negative feedback.

When the driving circuit for the touch device in the related art operates, both at the touch stage and at the display stage, the control circuit 12 controls the voltage of the positive input terminal of the operational amplifier 11 to be VDD×R2/(R1+R2), and at the touch stage, a voltage at the touch-sensing electrode is VDD×R2/(R1+R2), under which condition, the touch-sensing operation may be implemented. However, at the display stage, the voltage at the touch-sensing electrode is still the VDD×R2/(R1+R2), under which condition, the external static electricity cannot be shielded, the interference might be generated and a power consumption is also increased.

SUMMARY

One main purpose of the present disclosure is to provide a driving circuit and a driving method for a touch device, a touch device and a display device, so as to solve technical problems in the related art that a touch device controls a voltage at a touch-sensing electrode at a display stage to be still the one at a touch stage, and external static electricity cannot be shielded accordingly and then interference may be generated.

The present disclosure provides a driving circuit for a touch device. The touch device includes a touch sensing electrode. The driving circuit includes an operational amplifier and a control circuit. A negative input terminal of the operational amplifier is connected with the touch sensing electrode, and a positive input terminal of the operational amplifier is connected with the control circuit. The control circuit is used to, at a touch stage, adjust a voltage at the positive input terminal of the operational amplifier to be within a first predetermined voltage range so as to control the touch sensing electrode to implement a touch sensing operation, and at a display stage, adjust the voltage at the positive input terminal of the operational amplifier to be within a second predetermined voltage range, so as to screen external static electricity.

In implementation, the control circuit is further to control to provide a zero level to the positive input terminal of the operational amplifier at the display stage.

In implementation, the control circuit includes a first transistor, a second transistor, a first resistor and a second resistor. A first end of the first resistor is provided with a power voltage; a first end of the second resistor is connected to a second end of the first resistor, and a second end of the second resistor is grounded; a gate electrode of the first transistor is to receive a control signal, and a first electrode of the first transistor is connected to the first end of the second resistor; and a gate electrode of the second transistor is to receive the control signal, and a first electrode of the second transistor is connected to a second electrode of the first transistor and the positive input terminal of the operational amplifier, and a second electrode of the second transistor is connected to the second end of the second resistor.

In implementation, at the display stage, the control signal controls the first transistor to be turned on and the second transistor to be turned off; and at the touch stage, the control signal controls the first transistor to be turned off and the second transistor to be turned on.

In implementation, the driving circuit of the present disclosure further includes a feedback circuit arranged between the negative input terminal and an output terminal of the operational amplifier.

The feedback circuit includes a feedback capacitor and a feedback resistor connected in parallel and used to control the operational amplifier to implement deep negative feedback.

In implementation, the first predetermined voltage range and the second predetermined voltage range are different.

In implementation, the first predetermined voltage range and the second predetermined voltage range are not overlapped.

The present disclosure further provides a driving method for a touch device, the driving method is applied to the above driving circuit for a touch device. The driving method includes: at the touch stage, adjusting, by the control circuit, the voltage at the positive input terminal of the operational amplifier to be within the first predetermined voltage range so as to control the touch sensing electrode to implement the touch sensing operation; and at the display stage, adjusting, by the control circuit, the voltage at the positive input terminal of the operational amplifier to be within the second predetermined voltage range, so as to shield the external static electricity.

In implementation, the step of adjusting, by the control circuit, the voltage at the positive input terminal of the operational amplifier to be within the second predetermined voltage range includes: control to provide a zero level to the positive input terminal of the operational amplifier.

In implementation, the step of adjusting, by the control circuit, the voltage at the positive input terminal of the operational amplifier to be within the second predetermined voltage range includes: at the display stage, the control signal being at a high level, controlling the first transistor to be turned on and the second transistor to be turned off, such that the voltage at the positive input terminal of the operational amplifier is VDD×R2/(R1+R2), where the VDD is a power voltage, the R1 is a resistance of the first resistor, and the R2 is a resistance of the second resistor.

The step of adjusting, by the control circuit, the voltage at the positive input terminal of the operational amplifier to be within the first predetermined voltage range includes: at the touch stage, the control signal being at a low level, controlling the first transistor to be turned off and the second transistor to be turned on, such that the positive input terminal of the operational amplifier is grounded.

The present disclosure further provides a touch device including a touch sensing electrode and the above driving circuit. The negative input terminal of the operational amplifier included in the driving circuit is connected with the touch sensing electrode.

The present disclosure also provides a display device including the above mentioned touch device.

Comparing with the relevant art, the driving method and the driving circuit for the touch device, the touch device and the display device, controls the voltage at the positive input terminal of the operational amplifier to be within different predetermined voltage ranges at the touch stage and at the display stage by means of the control circuit, and according to the virtual short principle of an operational amplifier, the voltage at the negative input terminal of the operational amplifier (i.e., the voltage at the touch sensing electrode) is changed accordingly in accordance with the different operation stages. Thus, the external static electricity may be shielded at the display stage of the touch device and the interference may be reduced.

DETAILED DESCRIPTION

Technical solutions of embodiments of the present disclosure will be described clearly and briefly hereinafter in combination with the drawings of the embodiments of the present disclosure. Obviously, the described embodiments are only a part, but not all, of the embodiments of the present disclosure. All other embodiments obtained by one skilled in the art without creative work based on the embodiments of the present disclosure fall into the scope of the present disclosure.

Figure 1:
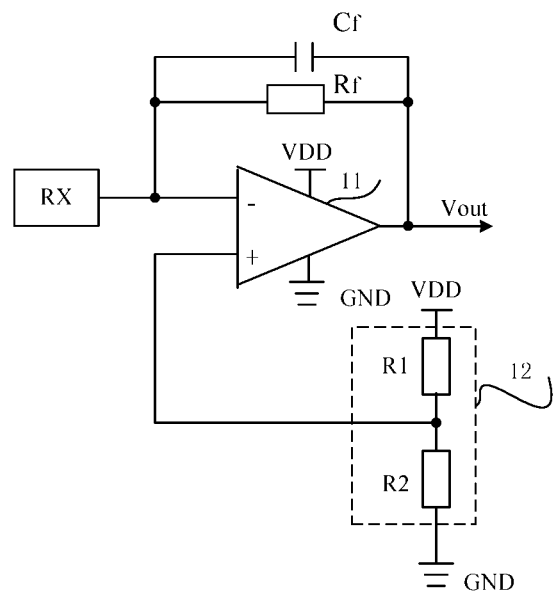
FIG. 1 is a circuit diagram of a driving circuit for a touch device in the related art.
Figure 2:
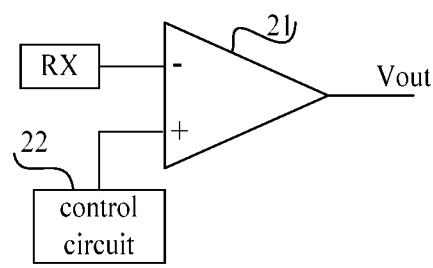
FIG. 2 is a circuit diagram of a driving circuit for a touch device in at least one embodiment of the present disclosure.

As shown in FIG. 2, a driving circuit for a touch device in at least one embodiment of the present disclosure includes an operational amplifier 21 and a control circuit 22.

A negative input terminal of the operational amplifier 21 is connected with a touch-sensing electrode RX included in the touch device. A positive input terminal of the operational amplifier 21 is connected with the control circuit 22. A voltage outputted by the operational amplifier 21 is Vout.

The control circuit 22 is configured to, at a touch stage, adjust a voltage at the positive input terminal of the operational amplifier 21 to be within a first predetermined voltage range so as to control the touch-sensing electrode RX to implement a touch sensing operation; and at a display stage, adjust the voltage at the positive input terminal of the operational amplifier 21 to be within a second predetermined voltage range so as to shield external static electricity.

The driving circuit for the touch device controls the voltage at the positive input terminal of the operational amplifier 21 to be within different predetermined voltage ranges at the touch stage and at the display stage by means of the control circuit 22, and according to the virtual short principle of an operational amplifier, the voltage at the negative input terminal of the operational amplifier 21 (i.e., the voltage at the touch-sensing electrode RX) is changed accordingly in accordance with the different operation stages. Thus, the external static electricity may be shielded at the display stage of the touch device and the interference may be reduced.

Optionally, the control circuit is specifically configured to control to provide a zero level to the positive input terminal of the operational amplifier at the display stage. In this way, the external static electricity may be eliminated more effectively, therefore further reducing the interference and the power consumption.

In implementation, the control circuit includes a first transistor, a second transistor, a first resistor and a second resistor.

A power voltage is supplied to a first end of the first resistor.

A first end of the second resistor is connected to a second end of the first resistor. A second end of the second resistor is connected to the ground.

A gate electrode of the first transistor receives a control signal. A first electrode of the first transistor is connected to the first end of the second resistor.

A gate electrode of the second transistor receives the control signal. A first electrode of the second transistor is connected to a second electrode of the first transistor and the positive input terminal of the operational amplifier, respectively. A second electrode of the second transistor is connected to the second end of the second resistor.

In implementation, at the display stage, the control signal controls the first transistor to be turned on and the second transistor to be turned off. At the touch stage, the control signal controls the first transistor to be turned off and the second transistor to be turned on.

In implementation, the driving circuit for the touch device of the present disclosure further includes a feedback circuit arranged between the negative input terminal and an output terminal of the operational amplifier.

The feedback circuit includes a feedback capacitor and a feedback resistor, which are arranged in parallel and are used to control the operational amplifier to implement the deep negative feedback.

Figure 3:
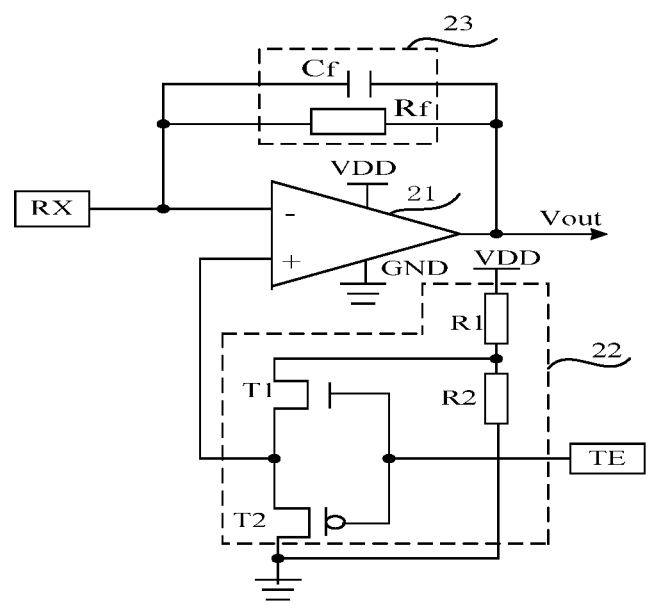
FIG. 3 is a circuit diagram of a driving circuit for a touch device in at least one embodiment of the present disclosure.

As shown in FIG. 3, the driving circuit for the touch device in at least one embodiment of the present disclosure includes an operational amplifier 21, a control circuit 22, and a feedback circuit 23.

The control circuit 22 includes a first transistor T1, a second transistor T2, a first resistor R1 and a second resistor R2.

A first end of the first resistor R1 is supplied with a power voltage VDD.

A first end of the second resistor R2 is connected to a second end of the first resistor R1. A second end of the second resistor R2 is connected to the ground.

A gate electrode of the first transistor T1 receives a control signal TE. A first electrode of the first transistor is connected to the first end of the second resistor R2.

A gate electrode of the second transistor T2 receives the control signal TE. A first electrode of the second transistor is connected to a second electrode of the first transistor T1 and a positive input terminal of the operational amplifier 21, respectively. A second electrode of the second transistor is connected to the second end of the second resistor R2.

A negative input terminal of the operational amplifier 21 is connected with a touch-sensing electrode RX. A voltage outputted by the operational amplifier 21 is Vout.

The feedback circuit 23 includes a feedback resistor Rf and a feedback capacitor Cf connected in parallel and arranged between the negative input terminal and the output terminal of the operational amplifier 21. The feedback circuit 23 is used to control the operational amplifier 21 to implement the deep negative feedback, so as to ensure equality between the voltage at the positive input terminal of the operational amplifier 21 and the voltage at the negative input terminal of the operational amplifier 21.

All of the transistors described in at least a part of the embodiments of the present disclosure may be thin-film transistors or field effect transistors or other devices having similar characteristics. In at least a part of the embodiments of the present disclosure, the two electrodes other than the gate electrode of each of the transistors are referred to as a first electrode and a second electrode, respectively.

In the example of the driving circuit shown in FIG. 3, T1 is an N-type transistor; T2 is a P-type transistor. In implementation, the types of the T1 and the T2 may be changed, which are well known for one skilled in the art, and thus are not repeated herein.

When the driving circuit shown in FIG. 3 is in operation, at the touch stage, the control signal TE is at a high level and controls the transistor T1 to be turned on and the transistor T2 to be turned off. At this time, the voltage of the positive input terminal of the operational amplifier 21 is VDD×R2/(R1+R2).

At the display stage, the control signal TE is at a low level and controls the transistor T1 to be turned off and the transistor T2 to be turned on. At this time, the positive input terminal of the operational amplifier 21 is grounded. According to the virtual-short principle of an operational amplifier, the voltage at the negative input terminal of the operational amplifier 21 is also zero. That is, the touch-sensing electrode RX is controlled to be grounded. Therefore, the touch device may eliminate the external static electricity effectively at the display stage and reduce the interference and the power consumption.

At the display stage, when the voltage at the positive input terminal of the operational amplifier may be the zero level or a positive level less than the power voltage VDD, the purpose of shielding the external static electricity may be achieved. Furthermore, when the positive input terminal of the operational amplifier is provided with zero level, the effect of shielding the external static electricity is the best, and the interference and the power consumption may be reduced.

The present disclosure further provides a driving method for a touch device applied to the above driving circuit for the touch device. The driving method includes: at the touch stage, adjusting, by the control circuit, the voltage at the positive input terminal of the operational amplifier to be within the first predetermined voltage range so as to control the touch-sensing electrode to implement the touch sensing operation; and at the display stage, adjusting, by the control circuit, the voltage at the positive input terminal of the operational amplifier to be within the second predetermined voltage range so as to shield the external static electricity.

The driving method for the touch device controls the voltage at the positive input terminal of the operational amplifier to be within different predetermined voltage ranges at the touch stage and at the display stage by means of the control circuit, and according to the virtual short principle of an operational amplifier, the voltage at the negative input terminal of the operational amplifier (i.e., the voltage at the touch-sensing electrode) is changed accordingly in accordance with the different operation stages. Thus, the external static electricity may be shielded at the display stage of the touch device and the interference and the power consumption may be reduced.

Optionally, the step of adjusting, by the control circuit, the voltage at the positive input terminal of the operational amplifier to be within the second predetermined voltage range specifically includes: controlling, by the control circuit, to provide a zero level to the positive input terminal of the operational amplifier. In this way, the external static electricity may be eliminated more effectively, therefore further reducing the interference and the power consumption.

In implementation, at the display stage, when the voltage at the positive input terminal of the operational amplifier may be the zero level or a positive level less than the power voltage VDD, the purpose of shielding the external static electricity may be achieved. Furthermore, when the positive input terminal of the operational amplifier is provided with the zero level, the effect of shielding the external static electricity is the best, and the interference and the power consumption may be reduced.

Optionally, the driving method for the touch device of the embodiments of the present disclosure specifically includes: at the display stage, the control signal being at the high level, controlling the first transistor to be turned on and the second transistor to be turned off, such that the voltage at the positive input terminal of the operational amplifier is VDD×R2/(R1+R2), where the VDD is the power voltage, the R1 is a resistance of the first resistor, and the R2 is a resistance of the second resistor; and at the touch stage, the control signal being at the low level, controlling the first transistor to be turned off and the second transistor to be turned on, such that the positive input terminal of the operational amplifier is grounded.

The present disclosure further provides a touch device including a touch-sensing electrode and the above driving circuit. The negative input terminal of the operational amplifier included in the driving circuit is connected with the touch-sensing electrode.

The present disclosure also provides a display device including the above mentioned touch device. The display device may be any product or component capable of displaying such as a liquid crystal panel, an electronic paper, an OLED panel, a mobile phone, a tablet, a television, a displayer, a laptop, a digital frame, and a navigator.

The above are only optional embodiments of the present disclosure. It should be pointed out that numerous modifications and embellishments may be made by one skilled in the art without departing the spirit of the present disclosure. Such modifications and embellishments should also be considered to be within the protection scope of the present disclosure.

What is claimed is:

1. A driving circuit for a touch device which comprises a touch-sensing electrode, the driving circuit comprising:
an operational amplifier, and
a control circuit;
wherein a negative input terminal of the operational amplifier is connected with the touch-sensing electrode; a positive input terminal of the operational amplifier is connected with the control circuit; a positive power supply terminal of the operational amplifier is provided with a power voltage; and a negative power supply terminal of the operational amplifier is grounded;
wherein the control circuit is configured to, at a touch stage, adjust a voltage at the positive input terminal of the operational amplifier to be within a first predetermined voltage range so as to control the touch-sensing electrode to implement a touch sensing operation; and at a display stage, adjust the voltage at the positive input terminal of the operational amplifier to be within a second predetermined voltage range so as to shield external static electricity;
wherein the control circuit is further configured to control to provide a zero voltage level to the positive input terminal of the operational amplifier at the display stage;
wherein the control circuit comprises a first transistor, a second transistor, a first resistor, and a second resistor; and
wherein a first end of the first resistor is connected with the positive power supply terminal of the operational amplifier; a first end of the second resistor is directly connected to a second end of the first resistor; a second end of the second resistor is grounded; a gate electrode of the first transistor is to receive a control signal; a first electrode of the first transistor is connected to the first end of the second resistor; and a gate electrode of the second transistor is to receive the control signal, a first electrode of the second transistor is connected to a second electrode of the first transistor and the positive input terminal of the operational amplifier, and a second electrode of the second transistor is connected to the second end of the second resistor.

2. The driving circuit according to claim 1, wherein at the display stage, the control signal controls the first transistor to be turned on and the second transistor to be turned off; and at the touch stage, the control signal controls the first transistor to be turned off and the second transistor to be turned on.

3. The driving circuit according to claim 1, further comprising a feedback circuit between the negative input terminal and an output terminal of the operational amplifier;
wherein the feedback circuit comprises a feedback capacitor and a feedback resistor connected in parallel and configured to control the operational amplifier to implement deep negative feedback.

4. The driving circuit according to claim 1, wherein the first predetermined voltage range and the second predetermined voltage range are different.

5. The driving circuit according to claim 1, wherein the first predetermined voltage range and the second predetermined voltage range are not overlapped.

6. A driving method for a touch device, which is applied to the driving circuit according to claim 1, the driving method comprising:
at a touch stage, adjusting, by a control circuit, a voltage at a positive input terminal of an operational amplifier to be within a first predetermined voltage range so as to control a touch-sensing electrode to implement a touch sensing operation; and
at a display stage, adjusting, by the control circuit, the voltage at the positive input terminal of the operational amplifier to be within a second predetermined voltage range so as to shield external static electricity.

7. The driving method according to claim 6, wherein the step of adjusting, by the control circuit, the voltage at the positive input terminal of the operational amplifier to be within the second predetermined voltage range comprises:
controlling, by the control circuit, to provide a zero level to the positive input terminal of the operational amplifier.

8. The driving method according to claim 6, wherein the step of adjusting, by the control circuit, the voltage at the positive input terminal of the operational amplifier to be within the second predetermined voltage range comprises:
at the display stage, controlling, by a control signal at a high level, a first transistor to be turned on and a second transistor to be turned off, such that the voltage at the positive input terminal of the operational amplifier is $VDD \times R2/(R1+R2)$, where the VDD is a power voltage, the R1 is a resistance of a first resistor, and the R2 is a resistance of a second resistor; and
wherein the step of adjusting, by the control circuit, the voltage at the positive input terminal of the operational amplifier to be within the first predetermined voltage range comprises:
at the touch stage, controlling, by a control signal at a low level, the first transistor to be turned off and the second transistor to be turned on, such that the positive input terminal of the operational amplifier is grounded.

9. The driving method according to claim 6, wherein the first predetermined voltage range and the second predetermined voltage range are different.

10. The driving method according to claim 6, wherein the first predetermined voltage range and the second predetermined voltage range are not overlapped.

11. A touch device comprising:
a touch-sensing electrode; and
a driving circuit;
wherein the driving circuit comprises an operational amplifier and a control circuit;
wherein a negative input terminal of the operational amplifier is connected with the touch-sensing electrode; a positive input terminal of the operational amplifier is connected with the control circuit; a positive power supply terminal of the operational amplifier is provided with a power voltage; and a negative power supply terminal of the operational amplifier is grounded;
wherein the control circuit is configured to, at a touch stage, adjust a voltage at the positive input terminal of the operational amplifier to be within a first predetermined voltage range so as to control the touch-sensing electrode to implement a touch sensing operation; and at a display stage, adjust the voltage at the positive input terminal of the operational amplifier to be within a second predetermined voltage range so as to shield external static electricity;

wherein the control circuit is further configured to control to provide a zero voltage level to the positive input terminal of the operational amplifier at the display stage;

wherein the control circuit comprises a first transistor, a second transistor, a first resistor, and a second resistor; and wherein a first end of the first resistor is connected with the positive power supply terminal of the operational amplifier; a first end of the second resistor is directly connected to a second end of the first resistor; a second end of the second resistor is grounded; a gate electrode of the first transistor is to receive a control signal; a first electrode of the first transistor is connected to the first end of the second resistor; and a gate electrode of the second transistor is to receive the control signal, a first electrode of the second transistor is connected to a second electrode of the first transistor and the positive input terminal of the operational amplifier, and a second electrode of the second transistor is connected to the second end of the second resistor.

12. A display device comprising: the touch device according to claim 11.

13. The touch device according to claim 11, wherein at the display stage, the control signal controls the first transistor to be turned on and the second transistor to be turned off; and at the touch stage, the control signal controls the first transistor to be turned off and the second transistor to be turned on.

14. The touch device according to claim 11, wherein the driving circuit further comprises a feedback circuit between the negative input terminal and an output terminal of the operational amplifier;

wherein the feedback circuit comprises a feedback capacitor and a feedback resistor connected in parallel and configured to control the operational amplifier to implement deep negative feedback.

15. The touch device according to claim 11, wherein the first predetermined voltage range and the second predetermined voltage range are different.

16. The touch device according to claim 11, wherein the first predetermined voltage range and the second predetermined voltage range are not overlapped.

* * * * *